J. J. CORCORAN.
TIRE PROTECTOR.
APPLICATION FILED MAY 20, 1913.
1,121,071. Patented Dec. 15, 1914.
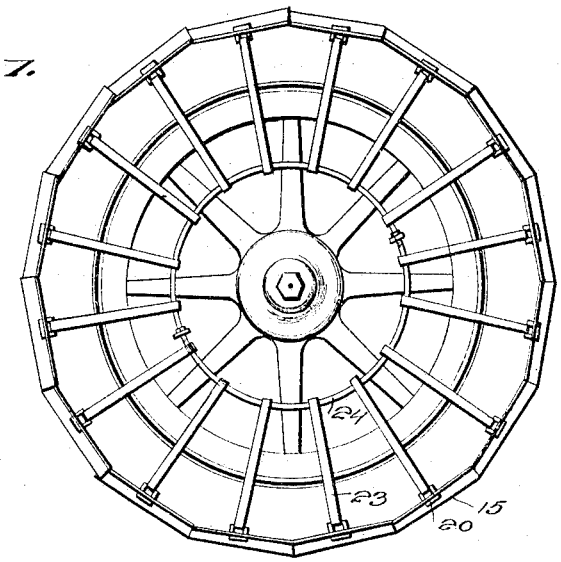
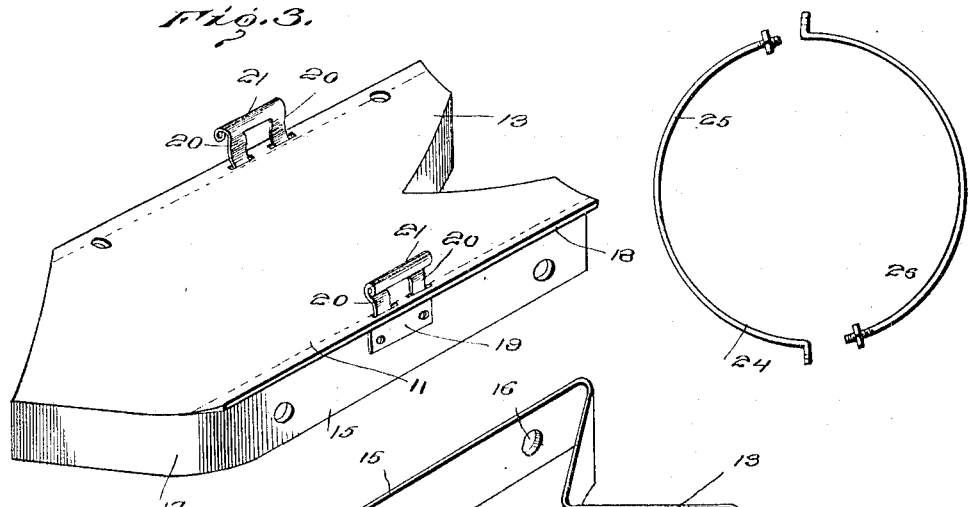
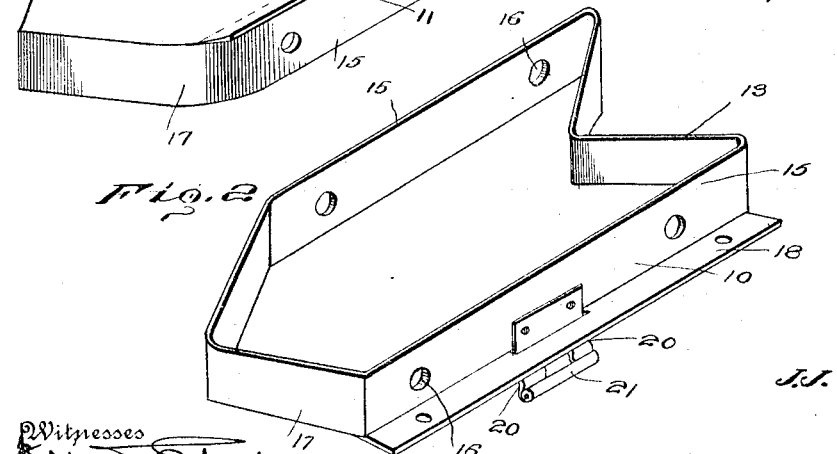
Inventor
J. J. Corcoran

UNITED STATES PATENT OFFICE.

JAMES J. CORCORAN, OF ADRIAN, MICHIGAN.

TIRE-PROTECTOR.

1,121,071.     Specification of Letters Patent.     Patented Dec. 15, 1914.

Application filed May 20, 1913. Serial No. 768,844.

*To all whom it may concern:*

Be it known that I, JAMES J. CORCORAN, citizen of the United States, residing at Adrian, in the county of Lenawee and State of Michigan, have invented certain new and useful Improvements in Tire-Protectors, of which the following is a specification.

This invention relates to an improvement in tire protectors for pneumatic tired wheels.

The primary object of the invention is to provide a device for protecting the rubber tires of wheels and which, at the same time, will effectually prevent skidding, affording the necessary traction on sandy or muddy roads.

A further object of the invention is to provide a structure that consists of a series of shoes, any of which may be readily removed, and which are so formed that when they are brought out of contact with the ground, suction, which would retard the progress of the wheel, is prevented.

A still further object of the invention is to provide a supporting means for the shoes which is not attached to the wheel and, therefore, does not necessitate the placing of securing devices thereon which have a tendency to weaken the wheel and add weight thereto.

For a full understanding of the invention, reference is to be had to the following description and accompanying drawing, in which:—

Figure 1 is a side elevation of a wheel equipped with the improved apparatus; Fig. 2 is a perspective view of one of the shoes; Fig. 3 is a perspective view looking at the under face of the same; Fig. 4 is a detail view of the means for supporting the shoe on the tire.

Corresponding and like parts are referred to in the following description and indicated in all the views of the accompanying drawing by the same reference characters.

In the drawing, 10 designates one of the shoes. This shoe consists of the plate 11 curved transversely to conform to the curvature of the tire. This plate at its edge 12 is formed with an inwardly directed V-shaped slot 13, the edge 14 of the plate being cut obliquely and converging to a point in alinement with the crotch of the slot 13. The plate is provided with a flange 15 which is either secured to or formed integral with its edge portions, thus forming a hollow gripping member, the flange being disposed to embed itself in sandy or muddy ground. The flange 15 at the sides of the plate is provided with openings 16 which, as the shoe is drawn out of the ground, will prevent the same from creating a vacuum and thus retarding the movement of the wheel.

The shoes 10 are arranged in a series on the tire, completely embracing the same, the tapered extension 17 of each shoe extending within the slot 13 of an adjacent shoe, the shoes being spaced sufficiently to allow for independent movement. The flange 15, which may either be formed integral with the plate 11 or secured thereto, is set inwardly with respect to the edge 18 of the plate. A bracket 19 is secured to the flange 15, being provided with the spaced arms 20 extending through the flange and which are connected by the transverse bail 21.

A bracket 19 is arranged on each side of the shoe, and these brackets receive straps 23. A sectional hoop 24 is arranged on each side of the wheel, said hoop consisting of semi-circular members 25 and 26 which are terminally connected in any suitable manner, but preferably by offsetting one terminal of each member and providing the other terminal with threads adapted to carry a nut, the threaded terminal of each section being received in an aperture formed in the offset portion of the opposite section, and said nuts being then applied to hold the sections together.

When the sections 25 and 26 are secured together and the straps 23 have been placed thereon, the straps are tightened until the members 24 are substantially concentric with the hub of the wheel. The shoes are in this manner effectually supported on the wheel without the necessity of providing the wheel with securing devices.

The many advantages of a construction of this character will be clearly apparent, as it will be noted that the device is such as may be easily and economically manufactured and that the various parts may be readily assembled.

The device is particularly adapted for use on sandy or muddy roads, affording the necessary traction as well as protecting the tire. The shoes may be formed of metal or of reinforced rubber, and the width of the flange may vary to suit the particular use to which the device is put. Attention is called to the fact that the resiliency of the tire will not be affected, as the members when in contact with the ground will depress the tire, each member being movable independently of the remaining members radially of the tire.

What I claim is:—

1. A protector for pneumatic tired wheels comprising a series of shoes movable independently and radially of the wheel, said shoes including transversely curved plates disposed to contact with the tire, one end of each shoe being formed with a V-shaped slot and the other end with a V-shaped extension, whereby the shoes, when assembled, may interlock, said plates being formed adjacent their outer edges with a continuous flange, brackets secured to the flange on each side of the plate, said brackets extending through the plate, a strap terminally connected with each of said brackets, and a ring arranged on each side of the wheel to which said straps are connected.

2. A protector for pneumatic tired wheels comprising a series of shoes movable independently and radially of the wheel, said shoes including transversely curved plates disposed to contact with the tire, one end of each shoe being formed with a slot and the other end with an extension, whereby the shoes, when assembled, may interlock, said plates being formed adjacent their outer edges with a continuous flange, brackets secured to the flange on each side of the plates, said brackets extending through the plates, a ring arranged on each side of the wheel, and a connection between said brackets and said rings.

In testimony whereof I affix my signature in presence of two witnesses.

JAMES J. CORCORAN. [L. S.]

Witnesses:
O. H. FORT,
VAL. RIEGEL.

Copies of this patent may be obtained for five cents each, by addressing the "Commissioner of Patents. Washington, D. C."